US011650286B2

(12) United States Patent
Fuchs

(10) Patent No.: US 11,650,286 B2
(45) Date of Patent: May 16, 2023

(54) METHOD FOR SEPARATING TARGETS AND CLUTTER FROM NOISE, IN RADAR SIGNALS

(71) Applicant: ARBE ROBOTICS LTD., Tel Aviv (IL)

(72) Inventor: Ronit Roxana Fuchs, Rehovot (IL)

(73) Assignee: Arbe Robotics Ltd.

( * ) Notice: Subject to any disclaimer, the term of this patent is extended or adjusted under 35 U.S.C. 154(b) by 478 days.

(21) Appl. No.: 16/479,732

(22) PCT Filed: Jan. 24, 2018

(86) PCT No.: PCT/IL2018/050091
§ 371 (c)(1),
(2) Date: Jul. 22, 2019

(87) PCT Pub. No.: WO2018/138725
PCT Pub. Date: Aug. 2, 2018

(65) Prior Publication Data
US 2021/0356558 A1     Nov. 18, 2021

(30) Foreign Application Priority Data

Jan. 24, 2017 (IL) .......................................... 250253

(51) Int. Cl.
*G01S 7/35* (2006.01)
*G01S 13/34* (2006.01)
*G01S 13/93* (2020.01)

(52) U.S. Cl.
CPC .............. *G01S 7/354* (2013.01); *G01S 7/356* (2021.05); *G01S 7/358* (2021.05); *G01S 13/345* (2013.01); *G01S 13/93* (2013.01)

(58) Field of Classification Search
CPC .......... G01S 7/354; G01S 7/356; G01S 7/358; G01S 13/345; G01S 13/93
See application file for complete search history.

(56) References Cited

U.S. PATENT DOCUMENTS 3,603,989 A    9/1971 Caspers
3,981,012 A    9/1976 Brault
(Continued)

FOREIGN PATENT DOCUMENTS

CN    1967286 A    5/2007
CN    101950851 A    1/2011
(Continued)

OTHER PUBLICATIONS

"Including probabilistic target detection attributes into map representations", Mullane et al, Robotics and Autonomous Systems 55 (2007) 72-85, www.Sciencedirect.com, Sep. 29, 2006.
(Continued)

*Primary Examiner* — Erin F Heard
*Assistant Examiner* — Juliana Cross
(74) *Attorney, Agent, or Firm* — Zaretsky Group PC; Howard Zaretsky

(57) ABSTRACT

A method for separating large and small targets from noise in radar IF signals, according to which a receiver receives, echo signals that are reflected from targets of different size (such as walls or ground), in response to the transmission of chirp FMCW radar signals, modulated (e.g., using Linear Frequency Modulation) in a predetermined modulation speed for a predetermined duration. The echo signals are down-converted by mixing them with the transmitted signal, to obtain received Intermediate Frequency (IF) signal, which is then sampled both in phase (I-channel) and in quadrature phase (Q-channel). The received IF signal passes a Fourier transform, to obtain power spectral components that belong to a relevant frequency domain, associated with an echo signal reflected from a real target, along with corresponding power spectral components that belong to an irrelevant, opposite frequency domain. The noise distribution and level in the relevant frequency domain is calculated by estimating (Continued)

the noise level in the irrelevant frequency domain and targets represented by a set of consequent relevant frequencies are detected by comparing the power spectral component at each relevant frequency to the calculated noise level and identifying power spectral components with likelihood, which is above a predetermined threshold.

19 Claims, 3 Drawing Sheets

(56) References Cited

U.S. PATENT DOCUMENTS

| | | | |
|---|---|---|---|
| 4,166,980 A | 9/1979 | Apostolos | |
| 4,197,540 A | 4/1980 | Riggs | |
| 4,494,083 A | 1/1985 | Josefsson | |
| 4,926,185 A | 5/1990 | Wittenberg | |
| 5,063,603 A | 11/1991 | Burt | |
| 5,424,742 A | 6/1995 | Long | |
| 5,430,445 A | 7/1995 | Peregrim | |
| 5,442,362 A | 8/1995 | Zwarts | |
| 5,923,280 A | 7/1999 | Farmer | |
| 5,955,992 A | 9/1999 | Shattil | |
| 6,028,548 A | 2/2000 | Farmer | |
| 6,104,673 A | 8/2000 | Cole | |
| 6,172,939 B1 | 1/2001 | Cole | |
| 6,204,803 B1 * | 3/2001 | Uehara | G01S 7/288 342/194 |
| 6,363,033 B1 | 3/2002 | Cole | |
| 6,614,384 B2 | 9/2003 | Hall | |
| 6,822,604 B2 | 11/2004 | Hall | |
| 6,828,929 B2 | 12/2004 | Barbella | |
| 6,865,216 B1 | 3/2005 | Beamish | |
| 6,888,887 B1 | 5/2005 | Shattil | |
| 6,989,782 B2 | 1/2006 | Walker | |
| 7,071,868 B2 | 7/2006 | Woodington | |
| 7,129,886 B2 | 10/2006 | Hall | |
| 7,308,043 B1 | 12/2007 | Frank | |
| 7,541,968 B2 | 6/2009 | Hall | |
| 7,639,171 B2 | 12/2009 | Alland | |
| 7,804,445 B1 | 9/2010 | Fiore | |
| 7,835,455 B2 | 11/2010 | Shattil | |
| 8,035,038 B2 | 10/2011 | Cheng | |
| 8,175,134 B1 | 5/2012 | Giallorenzi | |
| 8,599,062 B2 | 12/2013 | Szajnowski | |
| 8,762,139 B2 * | 6/2014 | Furuta | G10L 21/02 704/226 |
| 8,803,732 B2 | 8/2014 | Antonik | |
| 8,970,425 B2 | 3/2015 | Nogueira-Nine | |
| 9,250,322 B2 | 2/2016 | Newman | |
| 9,557,585 B1 | 1/2017 | Yap | |
| 9,645,228 B1 | 5/2017 | Doerry | |
| 9,791,564 B1 | 10/2017 | Harris | |
| 10,078,129 B2 * | 9/2018 | Sugino | G01S 7/023 |
| 10,082,570 B1 | 9/2018 | Izadian | |
| 10,094,920 B2 | 10/2018 | Rao | |
| 10,359,504 B2 | 7/2019 | Fetterman | |
| 10,451,723 B2 | 10/2019 | Chiu | |
| 11,199,617 B2 | 12/2021 | Hakobyan | |
| 11,277,902 B2 | 3/2022 | Snir | |
| 2002/0016547 A1 * | 2/2002 | Bang | A61B 8/06 600/504 |
| 2002/0130807 A1 | 9/2002 | Hall | |
| 2003/0151476 A1 | 8/2003 | Salmela | |
| 2004/0021599 A1 | 2/2004 | Hall | |
| 2004/0150552 A1 | 8/2004 | Barbella | |
| 2004/0196172 A1 | 10/2004 | Wasiewicz | |
| 2005/0083199 A1 | 4/2005 | Hall | |
| 2005/0156780 A1 | 7/2005 | Bonthron | |
| 2005/0232182 A1 | 10/2005 | Shattil | |
| 2007/0040728 A1 | 2/2007 | Nishimura | |
| 2007/0171123 A1 | 7/2007 | Nakano | |
| 2007/0205847 A1 | 9/2007 | Kushta | |
| 2008/0111686 A1 | 5/2008 | Hall | |
| 2008/0258964 A1 | 10/2008 | Schoeberl | |
| 2008/0284641 A1 | 11/2008 | Spreadbury | |
| 2008/0317345 A1 | 12/2008 | Wiedemann | |
| 2009/0085800 A1 | 4/2009 | Alland | |
| 2010/0074620 A1 * | 3/2010 | Linnartz | H04B 10/69 398/77 |
| 2010/0141508 A1 | 6/2010 | Nguyen | |
| 2011/0122014 A1 | 5/2011 | Szajnowski | |
| 2011/0279669 A1 | 11/2011 | Longstaff | |
| 2012/0056780 A1 | 3/2012 | Antonik | |
| 2012/0112955 A1 * | 5/2012 | Ando | G01S 13/931 342/159 |
| 2012/0146846 A1 | 6/2012 | Antonik | |
| 2012/0169523 A1 | 7/2012 | Lee | |
| 2012/0235859 A1 | 9/2012 | Hayase | |
| 2012/0313810 A1 | 12/2012 | Nogueira-Nine | |
| 2013/0009806 A1 | 1/2013 | Newman | |
| 2013/0257670 A1 | 10/2013 | Sovero | |
| 2014/0022113 A1 | 1/2014 | Nogueira-Nine | |
| 2014/0079248 A1 | 3/2014 | Short | |
| 2014/0211438 A1 | 7/2014 | Lin | |
| 2014/0218226 A1 * | 8/2014 | Raz | G01S 13/931 342/70 |
| 2014/0313070 A1 | 10/2014 | Asanuma | |
| 2014/0320231 A1 | 10/2014 | Seler | |
| 2014/0355385 A1 | 12/2014 | Inagaki | |
| 2015/0061928 A1 | 3/2015 | Cornic | |
| 2015/0323650 A1 | 11/2015 | Schuman | |
| 2016/0018511 A1 | 1/2016 | Nayyar | |
| 2016/0061942 A1 | 3/2016 | Rao | |
| 2016/0084941 A1 | 3/2016 | Arage | |
| 2016/0131738 A1 | 5/2016 | Prechtel | |
| 2016/0139254 A1 | 5/2016 | Wittenberg | |
| 2016/0187477 A1 | 6/2016 | Wang | |
| 2016/0285611 A1 | 9/2016 | Fischer | |
| 2016/0291146 A1 | 10/2016 | Wang | |
| 2016/0334502 A1 | 11/2016 | Ali | |
| 2016/0377711 A1 | 12/2016 | Arage | |
| 2017/0131394 A1 | 5/2017 | Roger | |
| 2017/0219689 A1 | 8/2017 | Hung | |
| 2017/0307744 A1 | 10/2017 | Loesch | |
| 2017/0343648 A1 | 11/2017 | Trotta | |
| 2018/0045819 A1 | 2/2018 | Cornic | |
| 2018/0074168 A1 * | 3/2018 | Subburaj | G01S 7/038 |
| 2018/0095162 A1 | 4/2018 | Fetterman | |
| 2018/0149736 A1 | 5/2018 | Alland | |
| 2018/0166794 A1 | 6/2018 | Raphaeli | |
| 2018/0172816 A1 | 6/2018 | Chiu | |
| 2018/0204358 A1 * | 7/2018 | An | A61B 5/055 |
| 2018/0350751 A1 | 12/2018 | Sun | |
| 2019/0004167 A1 | 1/2019 | Rao | |
| 2019/0050372 A1 | 2/2019 | Zeng | |
| 2019/0212428 A1 * | 7/2019 | Santra | G01S 7/282 |
| 2019/0235066 A1 | 8/2019 | Iida | |
| 2019/0265346 A1 | 8/2019 | Hakobyan | |
| 2019/0339382 A1 | 11/2019 | Hess | |
| 2020/0003884 A1 * | 1/2020 | Arkind | H01Q 21/28 |
| 2020/0011968 A1 | 1/2020 | Hammes | |
| 2020/0176393 A1 | 6/2020 | Ketterson | |
| 2020/0388578 A1 | 12/2020 | Lim | |
| 2020/0393536 A1 | 12/2020 | Stettiner | |
| 2021/0156980 A1 | 5/2021 | Stettiner | |
| 2021/0156981 A1 | 5/2021 | Stettiner | |
| 2021/0156982 A1 | 5/2021 | Stettiner | |
| 2021/0184340 A1 | 6/2021 | Stav | |
| 2021/0263147 A1 | 8/2021 | Bauer | |
| 2021/0275056 A1 | 9/2021 | McMahon | |
| 2021/0293923 A1 | 9/2021 | Arkind | |
| 2021/0318413 A1 | 10/2021 | Arkind | |
| 2021/0320425 A1 | 10/2021 | Arkind | |

FOREIGN PATENT DOCUMENTS

| | | | | |
|---|---|---|---|---|
| CN | 102866401 A | | 1/2013 | |
| CN | 105814262 A | * | 7/2016 | G01S 7/354 |
| CN | 106100696 A | | 11/2016 | |
| CN | 106249219 A | * | 12/2016 | G01S 7/411 |
| CN | 108089163 A | | 5/2018 | |
| DE | 102013216251 A1 | | 2/2015 | |
| DE | 102015218538 A1 | | 3/2017 | |

(56) References Cited

FOREIGN PATENT DOCUMENTS

| | | | |
|---|---|---|---|
| DE | 102016224900 A1 | 6/2018 | |
| EP | 0132795 A2 | 2/1985 | |
| EP | 3165941 A1 | 5/2017 | |
| GB | 2462148 A | 2/2010 | |
| WO | 2013/045232 A1 | 4/2013 | |
| WO | 2015/126505 A2 | 8/2015 | |
| WO | WO-2015126505 A2 * | 8/2015 | ............. G01S 13/42 |
| WO | 2016/168334 A1 | 10/2016 | |
| WO | 2017/069679 A1 | 4/2017 | |
| WO | 2017/208670 A1 | 12/2017 | |
| WO | 2018/138725 A1 | 8/2018 | |
| WO | 2018/142395 A1 | 8/2018 | |
| WO | 2018/142396 A1 | 8/2018 | |

OTHER PUBLICATIONS

International Search Report for PCT/IL2018/050091, dated May 21, 2018 (4 pages).

Written Opinion of the International Searching Authority for PCT/IL2018/050091, dated May 21, 2018 (5 pages).

P. Podder et al., Comparative Performance Analysis of Hamming, Hanning and Blackman Window, International Journal of Computer Applications (0975-8887) vol. 96—No. 18, Jun. 2014 (Year: 2014).

Jason Yu et al., "Multiband chirp synthesis for frequency-hopped FMCW radar", Signals, Systems And Computers, 2009 Conference Record Of The Forty-Third Asilomar Conference On, IEEE, Nov. 1, 2009 (Nov. 1, 2009), pp. 1315-1319.

Laribi Amir et al., "A new height-estimation method using FMCW radar Doppler beam sharpening", 2017 25TH European Signal Processing Conference (EUSIPCO), EURASIP, Aug. 28, 2017 (Aug. 28, 2017), pp. 1932-1396.

Miralles E, et al., "Multifunctional and compact 3D FMCW MIMO radar system with rectangular array for medium-range applications", IEEE Aerospace and Electronic Systems Magazine. May 7, 2018;33(4):46-54. Enric Miralles May 7, 2018 (May 7, 2018).

U. Prechtel et al.: "Short-Range Mimo Radar System Considerations", 2012 6th European Conference On Antennas and Propagation (EUCAP), Mar. 1, 2012 (Mar. 1, 2012), pp. 1742-1745, Xp055147564, DOI: 10.1109/EUCAP.2012.6206599, ISBN: 978-1-45-770919-7.

* cited by examiner

METHOD FOR SEPARATING TARGETS AND CLUTTER FROM NOISE, IN RADAR SIGNALS

FIELD OF THE INVENTION

The present invention relates to the field of radar systems for moving platforms, such as vehicles (e.g., autonomous cars), robots, and Unmanned Aerial Vehicles (UAVs, such as drones). More particularly, the invention relates to a method for separating targets and clutter from noise in radar Intermediate Frequency (IF) signals.

BACKGROUND OF THE INVENTION

As technology development is rapidly increases, the demand for autonomous moving platforms also increased. One of the widespread moving platforms is a drone. A drone, also known as Unmanned Aerial Vehicle (UAV) is a kind of an aircraft without a pilot on board. The flight of a UAV can be controlled in several ways, including using Radio Frequency (RF) radar sensors, for early obstacle detection and localization.

Other moving platforms that became popular are autonomous (ground) vehicles (which can sense their environment and navigating without human input) and robots. All these moving platforms require sensors for early obstacle detection and localization, in order to detect stationary and moving objects and avoid collisions with obstacles and other moving platforms in their environment.

Conventionally, radar systems are used for detecting point targets such as aircrafts or ships which are located in relatively long ranges. Today, more modern applications have different requirements. For example, an autonomous platform, such as a UAV, should be able to sense its environment (to avoid collisions between a UAV and stationary or moving objects) by creating a depth map of its surrounding environment, for example, by using Simultaneous Localization and Mapping (SLAM) technology. Since visual sensors such as camera have a poor depth sensing capability, radar is used as a complementary sensor for mapping purposes. This presents a new set of requirements for radar sensors. Specifically, there are few point targets in urban environments in short and middle ranges, and most objects that radar sensors should detect look like clutters (which are unwanted echoes in radars, typically returned from ground, sea, rain, a flock of animals/insects, chaff and atmospheric turbulences).

Basically, real time detection techniques detect targets only if their power is above the power of a clutter around them. However, for mapping purposes, the entire object should be detected as a target, should not regard as clutter and must be mapped, so as to avoid collision with relatively large obstacles, such as walls and ground surface. For example, a UAV may face obstacles like a wall that stands in the front direction or a side wall. These are obstacles that look like clutters that exist along substantial distances (e.g., about few meters long) and not located at separated distances and therefore, should be detected just like detecting point targets, to avoid collision. This implies that the radar should be able to efficiently separate clutter related power (which is not noise) from noise power.

Noise power generally originates from two main sources. The first source is environmental noise, which is temperature dependent. The second source is the electronic components of the radar system, coupling between antennas, etc. Therefore, the capability of evaluating the noise power and separating it from (large and small) targets related power is essential for reliably detecting real targets of different sizes.

One of the existing solutions for evaluating noise power is to direct the antennas of the radar sensor to the sky, where there are no targets or clutters. The received power provides a kind of noise signature, which may be used as a noise threshold that can be later used when the radar sensor is directed toward the environment direction, which contain point targets, large objects and ground. This can be considered as a "calibration" process that helps evaluating what will be the noise power component in this direction, in order to calculate the probability that a particular signal (received by the radar sensor) is noise. One way to use this evaluation is by determining a threshold, such that received signals which are above the threshold are considered to be targets and received signals which are below the threshold are considered to be noise. Another way is to use the "noise" signal of the sky to calculate the distribution function of the noise per distance (or distance, Doppler, and direction such as azimuth and/or elevation) bin (interval). This distribution function is then used to calculate the probability function of the noise, which is used to calculate the probability that a specific signal power level is the result of noise.

However, directing the radar sensor to the sky is problematic and requires difficult and sometimes impossible maneuvers, which should be done periodically, in order to calibrate the noise level.

Another existing solution for evaluating noise power is to look at the vicinity bins (each bin represent a distance or distance and direction such as azimuth and/or elevation) of a target and taking the average power of the bins around the bin with the target, to determine the noise threshold. However, in case of an environment with a lot of targets with different sizes, the bins around the checked bin might also contain targets. Especially, in case that the target is not a point target and hence, the target is found over multiple range/range and direction bins. In this case, the noise level estimation for those bins will be calculated as the signal level of the target and hence, the target will be considered as noise (range/range, Doppler, and direction bins are a scheme in which a digital radar uses a set of range/range, Doppler, and direction gates to chop up the return trace into segments and sum the value for each segment into an associated "bin" in a memory by using FFT (Fast Furrier Transform) algorithm). Each bin represents one range/range and direction). The radar system can inspect the bins to find the bins that contain a target.

"Including probabilistic target detection attributes into map representations", Mullane et al, Robotics and Autonomous Systems 55 (2007) 72-85, www.Sciencedirect.com, 29 Sep. 2006, discloses several ways to separate between noise to targets. However, all conventional radar-based sensing systems have not provided satisfactory solutions to the problem of evaluating the noise power, when the detected targets are large and not point targets and/or containing large number of dense targets.

It is therefore an object of the present invention to provide an effective method for separating point and large targets from noise in radar IF signals, without requiring any extra maneuvers.

It is another object of the present invention to provide an effective method for separating point and large targets from noise in radar IF signals, which uses already available data.

Other objects and advantages of the invention will become apparent as the description proceeds.

SUMMARY OF THE INVENTION

The present invention is directed to a method for separating large and small targets from noise in radar IF signals, according to which a receiver receives, echo signals that are reflected from targets of different size (such as walls or ground), in response to the transmission of chirp Frequency-Modulated Continuous-Wave (FMCW) radar signals, modulated (e.g., using Linear Frequency Modulation) in a predetermined modulation speed for a predetermined duration. The echo signals are down-converted by mixing them with the transmitted signal, using a mixer, to obtain received Intermediate Frequency (IF) signal, which is then sampled both in phase (I-channel) and in quadrature phase (Q-channel). The received IF signal passes a Fourier transform, to obtain power spectral components that belong to a relevant frequency domain, associated with an echo signal reflected from a real target, along with corresponding power spectral components that belong to an irrelevant, opposite frequency domain. The noise distribution and level in the relevant frequency domain is calculated using a processor, by estimating the noise level in the irrelevant frequency domain and targets represented by a set of consequent relevant frequencies are detected by comparing the power spectral component at each relevant frequency to the calculated noise level and identifying power spectral components having likelihood, which is above a predetermined threshold.

The present invention is also directed to a system for separating targets and clutter from noise in radar IF signals, which comprises:

a) a receiver for receiving echo signals being reflected from targets of different size, in response to the transmission of chirp FMCW radar signals, modulated in a predetermined modulation speed for a predetermined duration, b) a mixer for down-converting the echo signals by mixing them with the transmitted signal, thereby obtaining received Intermediate Frequency (IF) signal;

c) a sampler (such as an ADC) for sampling the IF signal both in phase (I-channel) and in quadrature phase (Q-channel);

d) a processor for:

d.1) performing a Fourier transform on the received IF signal and obtaining power spectral components that belong to a relevant frequency domain, associated with an echo signal reflected from a real target, along with corresponding power spectral components that belong to an irrelevant, opposite frequency domain;

d.2) calculating the noise distribution and level in the relevant frequency domain by estimating the noise level in the irrelevant frequency domain; and d.3) detecting targets represented by a set of consequent relevant frequencies, by comparing the power spectral component at each relevant frequency to the calculated noise level and identifying power spectral components having likelihood which is above a predetermined threshold.

The carrier frequency of the radar signal may be about 24 GHz with a bandwidth of about 250 MHz or about 77 GHz with a bandwidth of about 1 GHz.

The modulation speed is preferably determined to be sufficiently large, to guarantee that the frequency of the targets in the IF signal will have the same sign as of the modulation speed.

The noise level in the relevant frequency domain may be estimated by calculating, for each frequency component in the relevant frequency domain, the maximum amplitude value of a window of N samples around its corresponding frequency component in the irrelevant, opposite frequency domain. Alternatively, the noise level in the relevant frequency domain may be estimated by calculating the probability density function (PDF) of the noise in the irrelevant frequency domain.

DETAILED DESCRIPTION OF PREFERRED EMBODIMENTS

Figure 1:
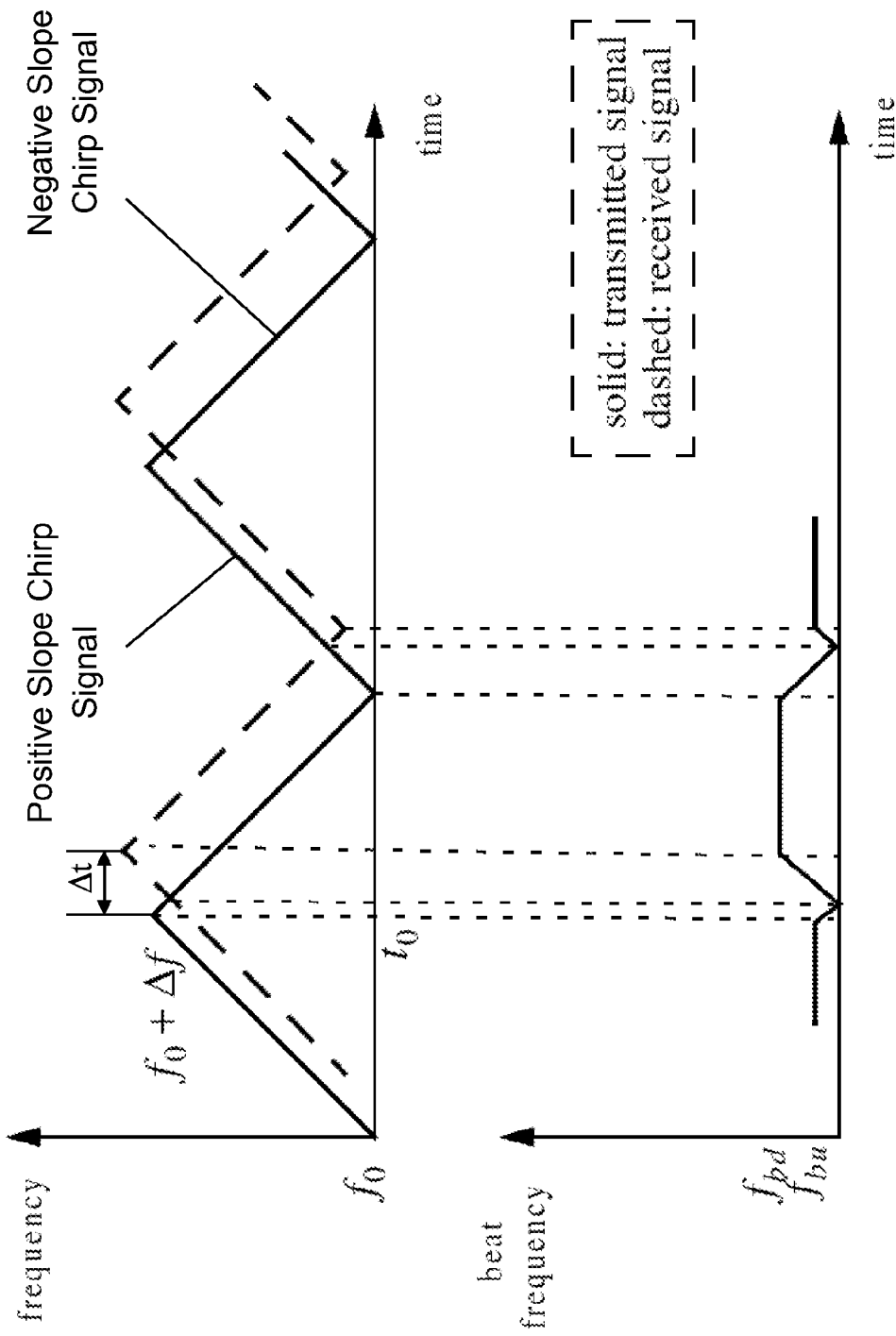
FIG. 1 (prior art) shows the transmitted and received Linear Frequency Modulation (LFM) signals and beat frequency, for a moving target, when using positive (up) and negative (down) slope of a chirp radar signal.

The present invention provides a method for evaluating the noise power, when the detected targets are large and not point targets, based on already available data. FIG. 1 (prior art) shows the transmitted and received Linear Frequency Modulation (LFM) signals and beat frequency, for a moving target, when using positive (up) and negative (down) slope of a chirp radar signal. The beat frequency $f_b$ is defined as $$f_b = f_{received} - f_{transmitted}$$

When the target is not stationary the received signal will contain a Doppler shift term in addition to the frequency shift due to the time delay ($\Delta t$). In this case, the Doppler shift term subtracts from the beat frequency during the positive portion of the slope. Alternatively, the two terms add up during the negative portion of the slope. One way of calculating the Doppler shift is to transmit a triangular chirp of up and down. The beat frequency during the positive (up) and negative (down) portions of the slope are defined as $f_{bu}$ and $f_{bd}$, respectively. In this case, the range to the target and the Doppler\target radial velocity (the radial velocity of an object with respect to a given point is the rate of change of the distance between the object and the point. That is, the radial velocity is the component of the object's velocity that points in the direction of the radius connecting the object and the point) as seen by the radar can be computed from $f_{bu}$ and $f_{bd}$. This method requires the processing algorithm to match the targets detected in the positive slope with targets detected in the negative slope, which might have different IF frequency. Since the beat frequency is proportional to the delay, and the delay is proportional to the range, knowledge of the beat frequency of any target entails knowledge of the range of that target. Multiple targets can be separated by taking the Fourier Transform of the received signal (using a processor), and determine range through frequency, using for example the Fast Fourier Transform (FFT) algorithm.

In case of radar with more than one receiving antenna, the phase difference between the received signals per antenna can be used to calculate the direction of the target. One way to calculate the direction is by using n-dimensional FFT and the beam forming algorithm where n=1 in case of range only, n=2 in case of one-dimension direction (azimuth or elevation) and n=3 in case of 2-dimensional direction (azimuth and elevation).

The method proposed by the present invention uses signals that are reflected from targets (echo signals), in response to transmitted FMCW radar signals that are modulated in a predetermined modulation speed for a predetermined duration, where one or more chirp signals (triangular (up/down), or only one direction, up or down) (Linear Frequency Modulation—LFM) (for example, but not limited to, 24 GHz with a bandwidth of 250 MHz or 77 GHz with bandwidth of 1 GHz) are transmitted for a certain duration.

While transmitting, the echoes are received by the receiver and mixed by a mixer with the transmit signal, and the result is filtered by band-pass filter to produce a superposition of beat frequencies.

In an FMCW radar, the received Intermediate Frequency (IF) signal is the sum of down-converted signals reflected from targets in the radar field of view, such that for each target, the frequency of the signal corresponds to the distance and radial velocity to the target according to the formula:

$$f_{IF} = \frac{2 \cdot R \cdot \beta}{c} - \frac{2 \cdot V_R}{c},$$

where R is the target distance, $V_R$ is the radial velocity (the radial velocity of an object with respect to a given point is the rate of change of the distance between the object and the point. That is, the radial velocity is the component of the object's velocity that points in the direction of the radius connecting the object and the point), c is the speed of light and β is the Linear Frequency Modulation (LFM) speed in Hz/sec. The sign of β indicates the direction of the LFM: for triangle modulation, β is first positive and then negative with the same absolute value. Whenever a large target is spread across multiple range bins, the target is detected as clutter, which makes the noise estimation around the target difficult.

Figure 2A:
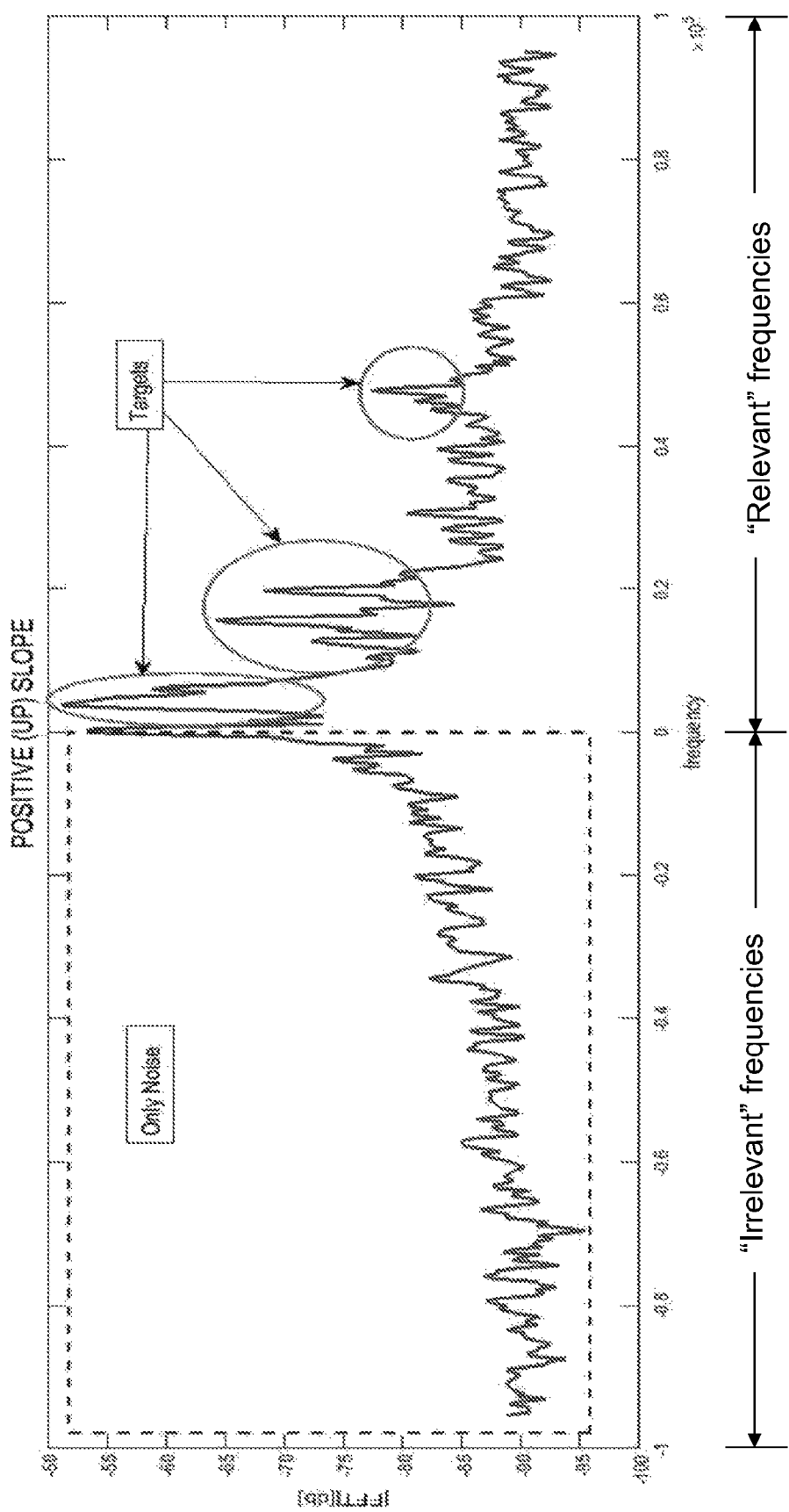
FIG. 2a shows the spectral components of a chirp radar signal with positive (up) slope after passing FFT.
Figure 2B:
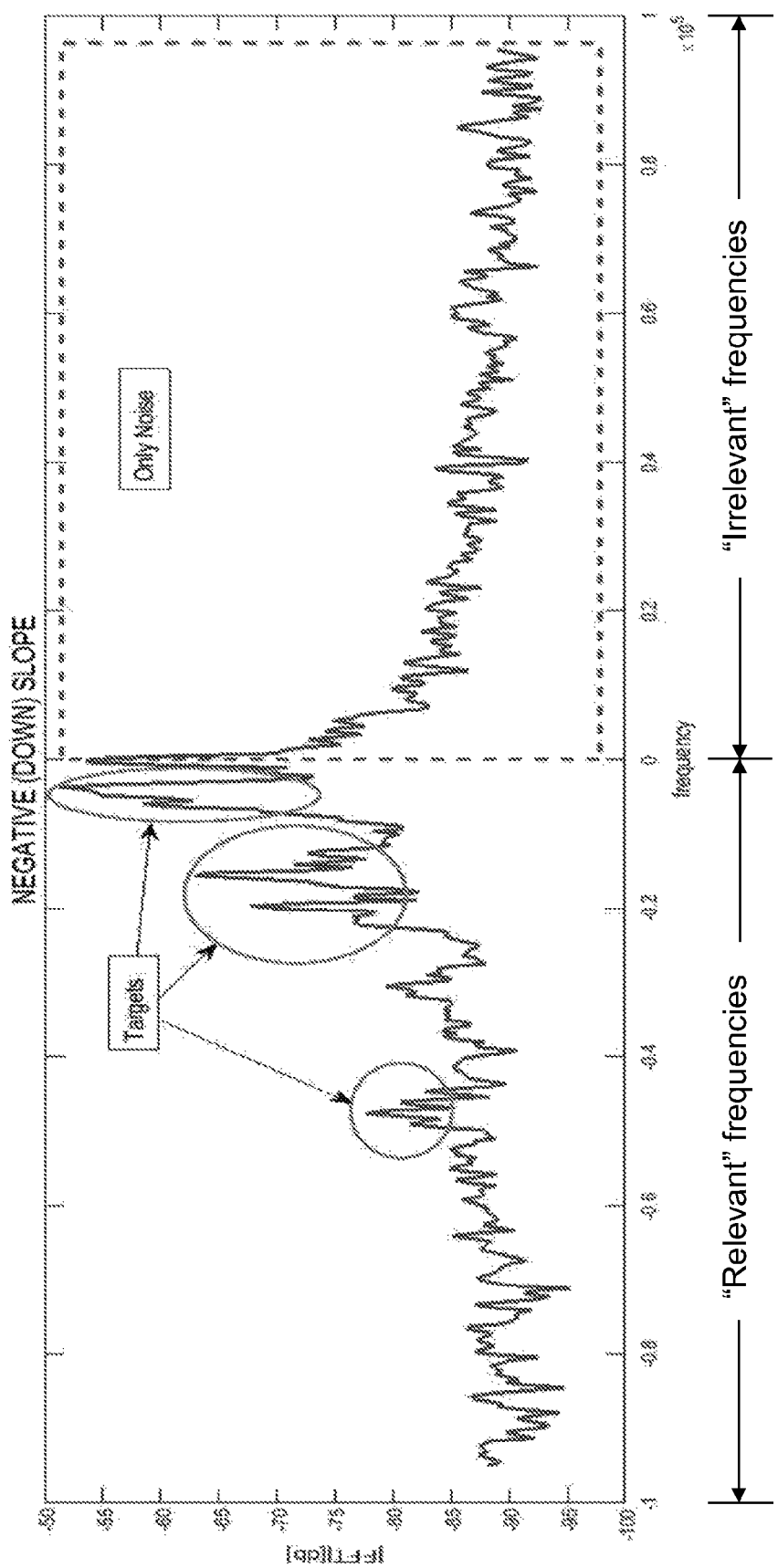
FIG. 2b shows the spectral components of a chirp radar signal with negative (down) slope after passing FFT.

According to the method proposed by the present invention, it is necessary to sample the IF signal by a sampler (such as an Analog To Digital Converter—ADC) both in phase (I channel) and in quadrature phase (Q channel). As a result, the sampled IF signal may be represented as a complex function (f_IF(t)=I+jQ, j=$\sqrt{-1}$). The Furrier transform of a complex function return the amplitude and phase of the function at the positive and negative frequencies (i.e., it enables to classify spectral power components at the negative frequencies domain and at the positive frequencies domain). Given a set bandwidth β, for example (but not limited to) β=250 MHz/sec or β=−250 MHz/sec, the slope of the transmitted signal can be set to be large enough, by changing the duration of the sweep, thereby reducing the period time T of the radar chirp signal, so it is guaranteed that in any practical situation, the frequency of the IF signal that has been reflected from a real target will always have the same sign as β (which are called hereinafter "relevant" frequencies, as shown in FIGS. 2a and 2b) and not be moved by the Doppler effect to the domain of "irrelevant" frequencies. Generally, each power spectral component in a relevant frequency domain that is associated with a signal reflected from a real target, will not have a corresponding power spectral component at the irrelevant (opposite) frequency domain, which is considered to contain only power resulting from noise.

FIG. 2a shows the spectral components of a chirp signal of the radar with positive (up) slope after passing FFT. It can be seen that the spectral power components (peaks) that are related to targets during the positive (up) slope, are located in the positive frequencies, while all spectral power components that are located in the negative frequencies are related solely to noise.

FIG. 2b shows the spectral components of a chirp radar signal with negative (down) slope after passing FFT. It can be seen that the spectral power components (peaks) that are related to targets during the negative (down) slope, are located in the negative frequencies, while all spectral power components that are located in the positive frequencies are related solely to noise.

The fact that the frequencies with the opposite sign (which are called "irrelevant" frequencies, as shown in FIGS. 2a and 2b) necessarily does not contain a target related signal, is used according to the present invention, to estimate the noise level.

By aiming the radar to an empty space (for example, to the sky), the Probability Density Function (PDF—a function, whose value at any given sample (or point) in the sample space (the set of possible values taken by the random variable) can be interpreted as providing a relative likelihood that the value of the random variable would equal that sample. The value of the PDF at two different samples can be used to infer, in any particular draw of the random variable, how much more likely it is that the random variable would equal one sample compared to the other sample. The PDF is used to specify the probability of the random variable falling within a particular range of values, as opposed to taking on any one value) of the noise in the "relevant" and "irrelevant" frequencies can be compared and proven equal.

The "relevant" frequencies are the frequencies with sign that might indicate on the existence of a target if its Signal to Noise Ratio (SNR) is above a predetermined threshold, or with a likelihood test above a predetermined threshold or any other test that is acceptable by the literature in this field of technology.

In case of positive sign (up) sweep (during which the frequencies of the transmitted radar signal increase linearly, i.e., β>0) the "relevant" frequencies will be the positive frequencies and the "irrelevant" frequencies are the negative frequencies. In case of negative sign (down) sweep (during which the frequencies of the transmitted radar signal decrease linearly, i.e., (β<0) the "relevant" frequencies will be the negative frequencies and the "irrelevant" frequencies are the positive frequencies.

Accordingly, the distribution function and level of the noise for each "relevant" frequency (f) is calculated by using the data from the amplitude values of the opposite frequency (−f).

The following (non-limitative) examples show how to use this data:

Example 1

For each recorded $f_{IF}$ of one sweep, calculate the furrier transform of the signal (FFT). For each "relevant" frequency (f), find the max amplitude value of a window of size N (N can be, but not limited to 20 frequency bins) around the corresponding "irrelevant" frequency (−f). Then, the signal power at each relevant frequency is compared with the computed noise level described above.

Example 2

Use signal data of M sweeps, M can be equal but not limited to 100. For each frequency f, the variance ($\sigma^2$) of the Rayleigh distribution (a continuous probability distribution for positive-valued random variables) is calculated from the PDF (Probability Density Function) of the M amplitudes from the "irrelevant" frequency −f. The variance $\sigma^2$ is used to calculate the probability that the amplitude of the frequency f is the result of only noise.

Both examples are based on methods used to conclude the probability that the signal came from noise and recognize that the distribution of the amplitude in the 'irrelevant' frequencies came from the same random variable as the noise in the 'relevant' frequencies.

Using those methods, every target, regardless of its size will be detected reliably and not only parts of it (as prior art methods do), since a large target will be described by a set of consequent relevant frequencies. For example, if a target is a 10 meters long sidewall, the power level of the target will be above the noise level for its entire length, since it is actually a collection of targets (at most, prior art methods will be able to detect only the proximal edge of the clutter, but not its longitudinal continuance).

Since all targets in the signal have "relevant" frequencies, their corresponding "irrelevant" frequencies of the FFT in the IF signal are used to estimate the noise levels. This is done by estimating the parameters of the PDF (probability density function) of the noise or using a sliding window which is moved over all "irrelevant frequencies", in order to detect the maximum amplitude value, which will be considered as the current noise level or any other method to estimate the noise level from data that contains only noise. This provides a probability function on the relevant frequencies which estimates the noise level and thereby allows the detection of large and small real targets (represented by a set of consequent relevant frequencies). Target detection is made by comparing the power spectral component at each relevant frequency to the calculated noise level and identifying power spectral components with likelihood which is above a predetermined threshold.

The proposed method is superior over existing noise estimation methods, since it allows making noise level calibrations in any desired time regardless of any movement limitations or required maneuvers, while using data (i.e., the spectral power components that are located in irrelevant frequencies) which is related solely to noise and is always available in radar systems in which the IF signal is sampled both in phase (I channel) and in quadrature phase (Q channel). The fact that the data required is always available allows the radar system to promptly respond to any change in the noise conditions, in order to continue which estimating the noise level and allow accurate detection of large and small real targets under changing noise conditions.

While some embodiments of the invention have been described by way of illustration, it will be apparent that the invention can be carried out with many modifications, variations and adaptations, and with the use of numerous equivalents or alternative solutions that are within the scope of persons skilled in the art, without exceeding the scope of the claims.

The invention claimed is:

1. A method for separating large and small targets from noise in radar IF signals, comprising:
   in response to the transmission of chirp FMCW radar signals, modulated in a predetermined modulation speed for a predetermined duration, receiving by a receiver, echo signals being reflected from targets of different size;
   down-converting said echo signals by mixing them, by a mixer, with the transmitted signal, thereby obtaining received Intermediate Frequency (IF) signal;
   sampling, by a sampler, said IF signal both in phase (I-channel) and in quadrature phase (Q-channel);
   performing, by a processor, a Fourier transform that returns the amplitude and phase at a relevant frequency domain and an irrelevant frequency domain on the received IF signal and obtaining power spectral components that belong to the relevant frequency domain associated with an echo signal reflected from a real target, along with corresponding power spectral components that belong to the irrelevant frequency domain;
   classifying spectral power components at the irrelevant frequency domain and at the relevant frequency domain;
   calculating, by said processor, ambient noise in said irrelevant frequency domain using data from the amplitude values of only the irrelevant frequency domain to generate a calculated ambient noise level; and
   detecting targets represented by a set of corresponding relevant frequencies, by comparing the power spectral component at each relevant frequency to the calculated ambient noise level and identifying power spectral components above said calculated ambient noise level.

2. The method according to claim 1, wherein the radar signals are modulated using Linear Frequency Modulation (LFM).

3. The method according to claim 1, wherein a carrier frequency of the radar signal is 24 GHz with a bandwidth of 250 MHz.

4. The method according to claim 1, wherein a carrier frequency of the radar signal is 77 GHz with a bandwidth of 1 GHz.

5. The method according to claim 1, wherein the modulation speed is determined to be sufficiently large, to guarantee that the frequency of the targets in the IF signal will have the same sign as of the modulation speed.

6. The method according to claim 1, wherein the targets are selected from the group consisting of walls and ground.

7. The method according to claim 1, wherein the ambient noise level in the relevant frequency domain is estimated by calculating, for each frequency component in said relevant frequency domain, the maximum amplitude value of a window of N samples around its corresponding frequency component in the irrelevant frequency domain.

8. The method according to claim 1, wherein the estimation of the ambient noise level in the relevant frequency domain is estimated by calculating the Probability Density Function (PDF) of the noise in the irrelevant frequency domain.

9. A system for separating targets and clutter from noise in radar IF signals, comprising:
   a receiver for receiving echo signals being reflected from targets of different size, in response to the transmission of chirp FMCW radar signals, modulated in a predetermined modulation speed for a predetermined duration;
   a mixer for down-converting said echo signals by mixing them with the transmitted signal, thereby obtaining received Intermediate Frequency (IF) signal;
   a sampler for sampling said IF signal both in phase (I-channel) and in quadrature phase (Q-channel);
   a processor for:
      performing a Fourier transform that returns the amplitude and phase at a relevant frequency domain and an irrelevant frequency domain, on the received IF signal and obtaining power spectral components that belong to the relevant frequency domain, associated with an echo signal reflected from a real target, along with corresponding power spectral components that belong to the irrelevant frequency domain;
      classifying spectral power components at the irrelevant frequency domain and at the relevant frequency domain;
      calculating an ambient noise level in said irrelevant frequency domain, using data only from the amplitude values of the irrelevant frequency domain; and detecting targets represented by a set of consequent relevant frequencies, by comparing the power spectral component at each relevant frequency to the calculated ambient noise level and identifying power spectral components above said calculated ambient noise level.

10. The system according to claim 9, wherein the ambient noise level in the relevant frequency domain is estimated by calculating, for each frequency component in said relevant frequency domain, the maximum amplitude value of a window of N samples around its corresponding frequency component in the irrelevant frequency domain.

11. The system according to claim 9, wherein the radar signals are modulated using Linear Frequency Modulation (LFM).

12. The system according to claim 9, wherein a carrier frequency of the radar signal is 24 GHz with a bandwidth of 250 MHz.

13. The system according to claim 9, wherein the carrier frequency of the radar signal is 77 GHz with a bandwidth of 1 GHz.

14. The system according to claim 9, wherein the modulation speed is determined to be sufficiently large, to guarantee that the frequency of the IF signal will have the same sign as of the modulation speed.

15. The system according to claim 9, wherein the estimation of the ambient noise level in the relevant frequency domain is estimated by calculating the probability density function (PDF) of the noise in the irrelevant frequency domain.

16. The system according to claim 9, wherein the sampler comprises an ADC.

17. A method for separating targets from noise in radar IF signals, comprising:
   receiving echo signals reflected from multiple targets at a receiver in response to transmission of modulated chirp FMCW radar signals;
   downconverting said echo signals by mixing them via a mixer with the transmitted signal to generate a received intermediate frequency (IF) signal;
   sampling via a sampler said IF signal both in phase and quadrature phase to generate I channel and Q channel signals, respectively;
   performing via a processor a Fourier transform on the received IF signal to generate amplitude and phase in a relevant frequency domain and in an irrelevant frequency domain including power spectral components associated with echo signals reflected from real targets in the relevant frequency domain and power spectral components associated with ambient noise in the irrelevant frequency domain;
   calculating via said processor an ambient noise threshold from the results of said Fourier transform in said irrelevant frequency domain, wherein the estimation of the ambient noise level in the relevant frequency domain is estimated by calculating the Probability Density Function (PDF) of the noise using only the irrelevant frequency domain; and
   detecting targets by comparing the power spectral component at each relevant frequency to the ambient noise threshold and identifying power spectral components above the ambient noise threshold.

18. The method according to claim 17, wherein the ambient noise level in the relevant frequency domain is estimated by calculating, for each frequency component in said relevant frequency domain, the maximum amplitude value of a window of N samples around its corresponding frequency component in the irrelevant frequency domain.

19. The method according to claim 17, further comprising re-calculating said ambient noise level in response to changing ambient noise conditions.

* * * * *